US012795012B2

(12) United States Patent
Prasad et al.

(10) Patent No.: US 12,795,012 B2
(45) Date of Patent: Nov. 10, 2026

(54) SYSTEM AND A METHOD FOR MANAGING TELEPHONE CALLS IN A VEHICLE

(71) Applicant: TVS MOTOR COMPANY LIMITED, Chennai (IN)

(72) Inventors: Raghavendra Prasad, Chennai (IN); Ramanathan Vaishali, Chennai (IN)

(73) Assignee: TVS Motor Company Limited, Chennai (IN)

( * ) Notice: Subject to any disclaimer, the term of this patent is extended or adjusted under 35 U.S.C. 154(b) by 278 days.

(21) Appl. No.: 18/708,923

(22) PCT Filed: Aug. 18, 2022

(86) PCT No.: PCT/IN2022/050747
§ 371 (c)(1),
(2) Date: May 9, 2024

(87) PCT Pub. No.: WO2023/084533
PCT Pub. Date: May 19, 2023

(65) Prior Publication Data

US 2025/0023975 A1 Jan. 16, 2025

(30) Foreign Application Priority Data

Nov. 9, 2021 (IN) ............................. 202141051335

(51) Int. Cl.
*H04M 1/57* (2006.01)
*B60K 35/10* (2024.01)
(Continued)

(52) U.S. Cl.
CPC ............. *H04M 1/576* (2013.01); *B60K 35/10* (2024.01); *B60K 35/22* (2024.01); *H04M 1/2746* (2020.01); *B60K 2360/563* (2024.01)

(58) Field of Classification Search
CPC .. H04M 1/576; H04M 1/2746; H04M 1/6075; B60K 35/10; B60K 35/22; B60K 2360/563; B60K 35/80
(Continued)

(56) References Cited

U.S. PATENT DOCUMENTS

2005/0085274 A1* 4/2005 Lee ..................... H04M 1/2746 455/566
2007/0205875 A1* 9/2007 De Haan et al. ..... H04M 1/575 340/902
(Continued)

FOREIGN PATENT DOCUMENTS

EP 2675147 B1 * 3/2022 .......... H04M 3/4872
EP 4494988 A2 * 1/2025 ............. B60K 35/60
GB 2477938 A * 8/2011 .......... H04M 1/6075

OTHER PUBLICATIONS

International Search Report issued in corresponding International Application No. PCT/IN2022/050747, dated Oct. 7, 2022 (3 pages).
(Continued)

*Primary Examiner* — Mahendra R Patel
(74) *Attorney, Agent, or Firm* — Osha Bergman Watanabe & Burton LLP

(57) ABSTRACT

A system for managing telephone calls in a vehicle includes instrument cluster and memory unit which is configured to save data indicative of contact number and image of caller. The system further includes control unit which is configured to identify if there is an incoming call from caller, compare contact number of incoming call with recently contacted numbers of callers and/or prioritized contact list from saved data in memory unit, determine if present caller is one of callers from recently contacted callers and/or from prioritized contact list, obtain image of present caller from memory unit, and display image of present caller onto a display unit of instrument cluster if present caller is deter-
(Continued)

mined to be one of the callers from recently contacted caller and/or from prioritized contact list.

6 Claims, 4 Drawing Sheets

(51) Int. Cl.
*B60K 35/22* (2024.01)
*H04M 1/2746* (2020.01)
(58) Field of Classification Search
USPC .......................................................... 455/415
See application file for complete search history.

(56) References Cited

U.S. PATENT DOCUMENTS

2008/0305764 A1* 12/2008 Walter ................ H04M 1/2757 455/413
2010/0144398 A1* 6/2010 Abeta et al. ...... H04M 1/72436 455/569.2
2011/0014932 A1* 1/2011 Estevez .................. G01S 19/14 455/466
2013/0137404 A1* 5/2013 Kuo et al. ............... H04W 4/40 455/418
2018/0367963 A1* 12/2018 Moon ..................... H04W 4/12
2020/0288281 A1* 9/2020 Moon ..................... H04W 4/12

OTHER PUBLICATIONS

Written Opinion issued in corresponding International Application No. PCT/IN2022/050747, dated Oct. 7, 2022 (6 pages).

* cited by examiner

SYSTEM AND A METHOD FOR MANAGING TELEPHONE CALLS IN A VEHICLE

FIELD OF THE INVENTION

The present invention generally relates to a system and a method for managing telephone calls in a vehicle.

BACKGROUND OF THE INVENTION

Generally, in case of connected instrument cluster, all the caller information is displayed over the cluster during any incoming call. The data transfer occurs via Bluetooth communication between a smartphone and the instrument cluster. Since the contact information of the caller also includes high resolution contact picture, transferring such a higher data bytes all the time will load processor as well and thus could lead to delayed display of the data onto the instrument cluster of the vehicle. In order to avoid such situation, one way of existing method includes storing of last five recently called or dialed contact information in a memory of the instrument cluster. Thus, during each time if any call is received then the instrument cluster would directly display the picture of the caller from the memory. This may reduce delay time and data load on the processor.

In case of such system where the instrument cluster is connected to a personal digital assistant through wireless means, if any call or message is received, the contact number and name are displayed on the instrument cluster. However, this system would take some time to process the name and number which could divert attention of the driver. Further, if an image of the caller is to be displayed on the instrument cluster, transferring of the image file takes a lot of time if the file size is very big. More particularly, in case of Bluetooth transfer since it is slower when compared to a USB based data transfer.

In one kind of existing system managing a mobile communication device involves a step of receiving a communication event and spatial state for the mobile device. If the event is one of a preselected types and the spatial state of the device satisfies a preselected condition, the communication event is call-processed while initiating a notification of the event to a user of the mobile device. In this kind of system, the spatial state includes a speed of the mobile device, an acceleration of the mobile device, a position of the mobile device, an altitude of the mobile device, a vibration of the mobile device. The condition is detected if the device is determined to be within an on-ground stage, which is based on an altitude in proximity to a ground level or a vibration associated with a landing. This system may not be able to manage calls if the communication event and spatial state for the mobile device is not received. Further, if the communication event is not one of the preselected types or the spatial state does not satisfy the preselected condition, the communication event is call-processed and the notification of the event to the user is disabled.

Thus, there is a need in the art for a system and a method to manage telephone calls in a vehicle which could address at least the aforementioned problems and limitations.

SUMMARY OF THE INVENTION

In one aspect, the present invention is directed to a system for managing telephone calls in a vehicle. The system includes an instrument cluster configured to be in communication with a personal digital assistant device of a rider. The system further includes a memory unit in connection with the instrument cluster. The memory unit is configured to save data indicative of contact number and an image of a caller. The system further includes a control unit in communication with the instrument cluster and the memory unit. The control unit is configured to identify if there is an incoming call from a caller, compare contact number of the incoming call with recently contacted numbers of callers and/or a prioritized contact list from the saved data in the memory unit, determine if present caller is one of the callers from the recently contacted callers and/or from the prioritized contact list, obtain an image of the present caller from the memory unit, and display the image of the present caller onto a display unit of the instrument cluster if the present caller is determined to be one of the callers from the recently contacted caller and/or from the prioritized contact list.

In an embodiment, the prioritized contact list of callers is obtained from the personal digital assistant device of the rider.

In a further embodiment, the prioritized contact list of callers is set based on frequency of calls received from a list of contacts in the personal digital assistant device of the rider.

In a further embodiment, the prioritized contact list of callers is set by the rider of the vehicle.

In a further embodiment, the memory unit is configured to save data indicative of contact numbers and images of callers from the prioritized contact list and/or from the frequently contacted callers list.

In another aspect, the present invention is directed to a method for managing telephone calls in a vehicle. The method includes saving, in a memory unit, data indicative of contact number and image of a caller; identifying, by a control unit, if there is an incoming call from a caller; comparing, by the control unit, the contact number of the incoming call with the recently contacted numbers of callers and/or the prioritized contact list from the saved data in the memory unit; determining, by the control unit, if present caller is one of the callers from the recently contacted callers and/or from the prioritized contact list; obtaining, by the control unit, an image of the present caller from the memory unit; and displaying, by the control unit, the image of the present caller onto a display unit of the instrument cluster if the present caller is determined to be one of the callers from the recently contacted caller and/or from the prioritized contact list.

BRIEF DESCRIPTION OF THE DRAWINGS

Reference will be made to embodiments of the invention, examples of which may be illustrated in accompanying figures. These figures are intended to be illustrative, not limiting. Although the invention is generally described in context of these embodiments, it should be understood that it is not intended to limit the scope of the invention to these particular embodiments.

DETAILED DESCRIPTION OF THE INVENTION

Various features and embodiments of the present invention here will be discernible from the following further description thereof, set out hereunder. In the ensuing exemplary embodiments, the vehicle is a two-wheeled vehicle. However, it is contemplated that the disclosure in the present invention may be applied to any automobile like a three-wheeled vehicle or a four-wheeled vehicle capable of accommodating the present subject matter without defeating the scope of the present invention.

The present invention generally relates to a system and a method for managing telephone calls in a vehicle, for example a two-wheeled vehicle.

Figure 1:
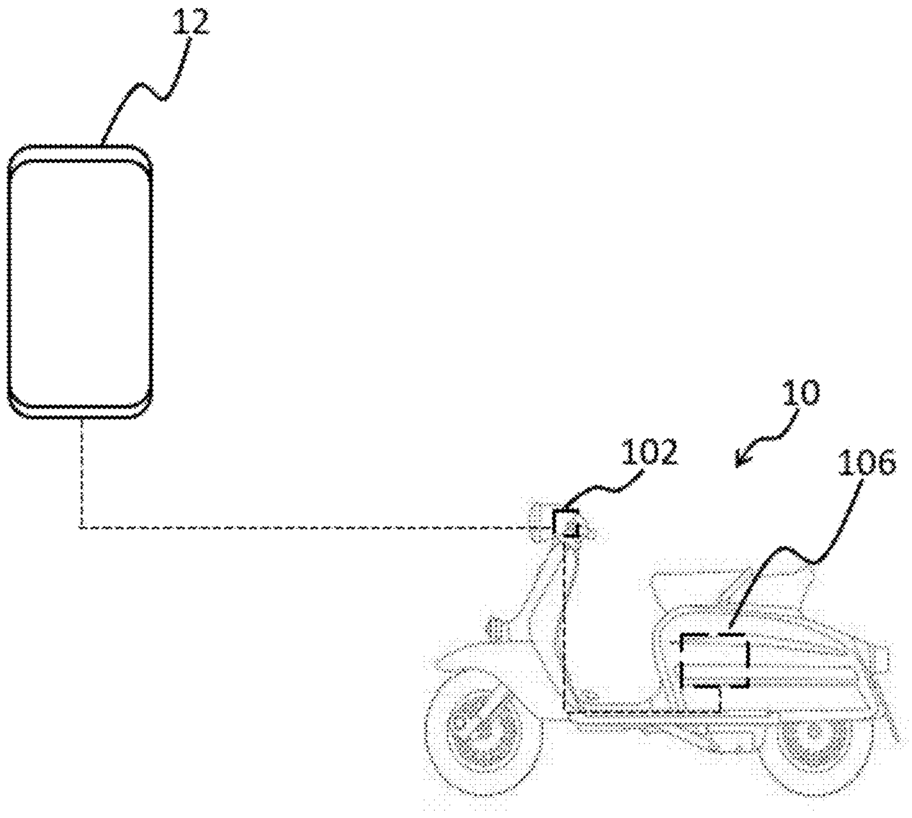
FIG. 1 illustrates a schematic diagram of a vehicle having an instrument cluster which is in communication with a personal digital assistant device and a control unit of the vehicle, in accordance with an embodiment of the present invention.
Figure 2:
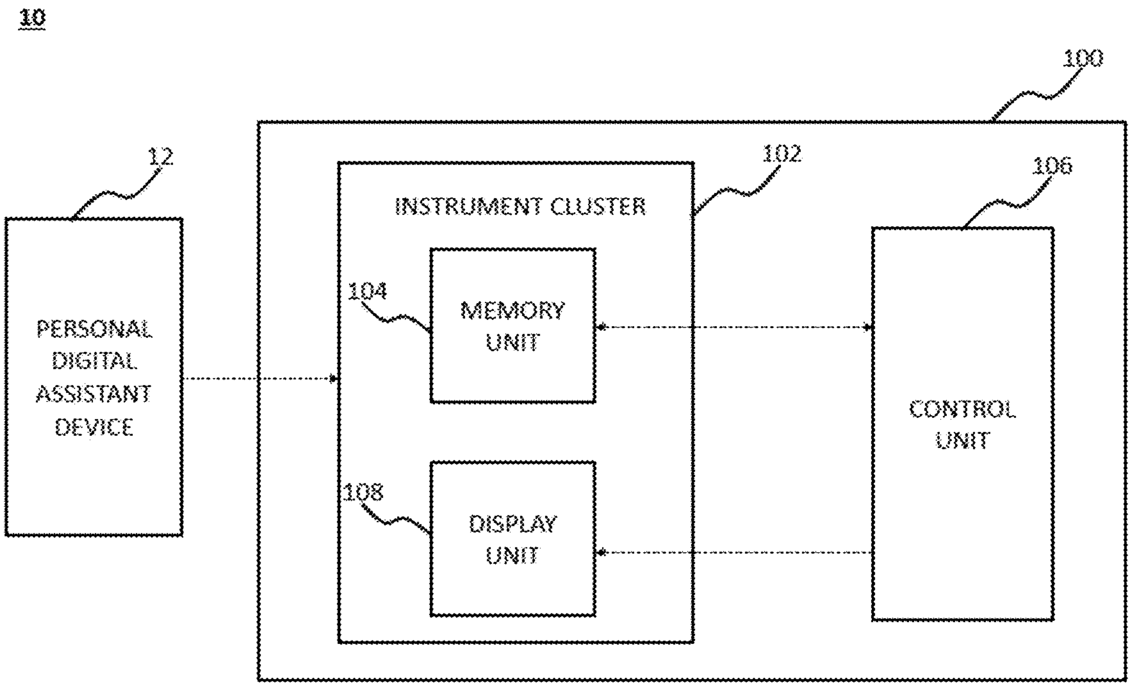
FIG. 2 illustrates a schematic block diagram of the vehicle having a system for managing telephone calls, in accordance with an embodiment of the present invention.

Referring to FIGS. 1 and 2, a system 100 for managing telephone calls in a vehicle 10, in accordance with an embodiment of the present invention is disclosed. The term "vehicle" as used in the present disclosure may include, but not limited to, a "two-wheeled vehicle". The terms "vehicle" and "two-wheeled vehicle" as used herein are interchangeably used and they are one and the same. However, the term "vehicle" is used in place of the term "two-wheeled vehicle" for brevity.

The two-wheeled vehicle 10 typically include a frame member (not shown) which can be configured to support one or more components of the vehicle 10. At a front portion of the vehicle 10, a headtube (not shown) of the frame member is adapted to support a handlebar (not shown) and an instrument cluster 102. The instrument cluster 102 typically includes one or more segments of display having a speedometer, an rpm meter and a fuel gauge. In an exemplary embodiment, the instrument cluster 102 may be analog or digital or a combination of analog and digital cluster.

In an exemplary embodiment of the present invention, the instrument cluster 102 of the vehicle 10 is configured to be in communication with the personal digital assistant (PDA) device 12 of a rider. In one embodiment, the PDA device 12 and the instrument cluster 102 may be communicated through wireless means like Bluetooth. The term "personal digital assistant (PDA) device" is generally a handheld device including, but not limited to, a mobile phone or a handheld device or a tablet. The PDA device 12 may include one or more inbuilt or downloadable software or applications and a memory (not shown) which may store contact details of callers with contact numbers and their corresponding images. In an exemplary embodiment of the present invention, the PDA device 12 may be configured to save contact details like, contact number and an image of callers who have called to the rider. The image can be a bitmap image having a photo of a contact person or a caller. In one exemplary embodiment, the PDA device 12 includes a prioritized contact list of callers. In an embodiment, the prioritized contact list of the callers is set based on frequency of calls received from a list of contacts in the PDA device 12 of the rider. In another embodiment, the prioritized contact list of callers is set by the rider of the vehicle 10. The term "rider" as used in the present disclosure is a person who drives the vehicle 10.

As illustrated in FIG. 2, the system 100 further includes a memory unit 104 in connection with the instrument cluster 102. The memory unit 104 is configured to save data indicative of contact number and an image of a caller.

In another embodiment, the memory unit 104 is configured to save data indicative of contact numbers and images of callers from the prioritized contact list and/or from the frequently contacted callers list.

In yet another embodiment, the prioritized contact list can be directly obtained from the PDA device 12 of the rider, which is set by the rider.

As illustrated in FIG. 2, the system 100 further includes a control unit 106. In an embodiment, the control unit 106 can be configured within an Electronic Control Unit (ECU) (not shown) of the vehicle 10. In another embodiment, the control unit 106 can be configured as a separate module which can be in communication with the ECU of the vehicle 10.

In some embodiments, the control unit 106 may include one or more additional components such as, but not limited to, an input/output module and a pre-processing module. In another embodiment, the system 100 may include more than one of same or similar control unit(s) 106.

In another embodiment, the control unit 106 may include only a processor which may be required to process the received instructions/signals from one or more inputs device like the memory unit 104 and/or the instrument cluster 102 of the vehicle 10 and process the same. In yet another embodiment, the system 100 can be in communication with an analytic module (not shown) which may be configured to perform additional analysis of the communication information received from the memory unit 104 of the vehicle 10.

In some embodiments, the memory unit 104 in communication with the control unit 106 is capable of storing machine executable instructions. Further, the control unit 106 is capable of executing the machine executable instructions to perform the functions described herein. The control unit 106 is in communication with the components such as the pre-processing module and the analytic module. In another embodiment, the control unit 106 may be embodied as a multi-core processor, a single core processor, or a combination of one or more multi-core processors and one or more single core processors. For example, the control unit 106 is embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In yet another embodiment, the control unit 106 may be configured to execute hard-coded functionality. In still another embodiment, the control unit 106 may be embodied as an executor of instructions, where the instructions are specifically configured to the control unit 106 to perform the steps or operations described herein for managing telephone calls in the vehicle 10.

In an embodiment as shown in FIG. 2, the control unit 106 is in communication with the instrument cluster 102 and the memory unit 104. The control unit 106 is configured to identify if there is an incoming call from a caller. If there is an incoming call, then the control unit 106 is configured to compare contact number of the incoming call with recently contacted numbers of callers and/or a prioritized contact list from the saved data in the memory unit 104. The control unit 106 is further configured to determine if the present caller is one of the callers from the recently contacted callers and/or from the prioritized contact list. The control unit 106 is further configured to obtain an image of the present caller from the memory unit 104 and display the image of the present caller onto a display unit 108 of the instrument cluster 102 if the present caller is determined to be one of the callers from the recently contacted caller and/or from the prioritized contact list.

Figure 3:
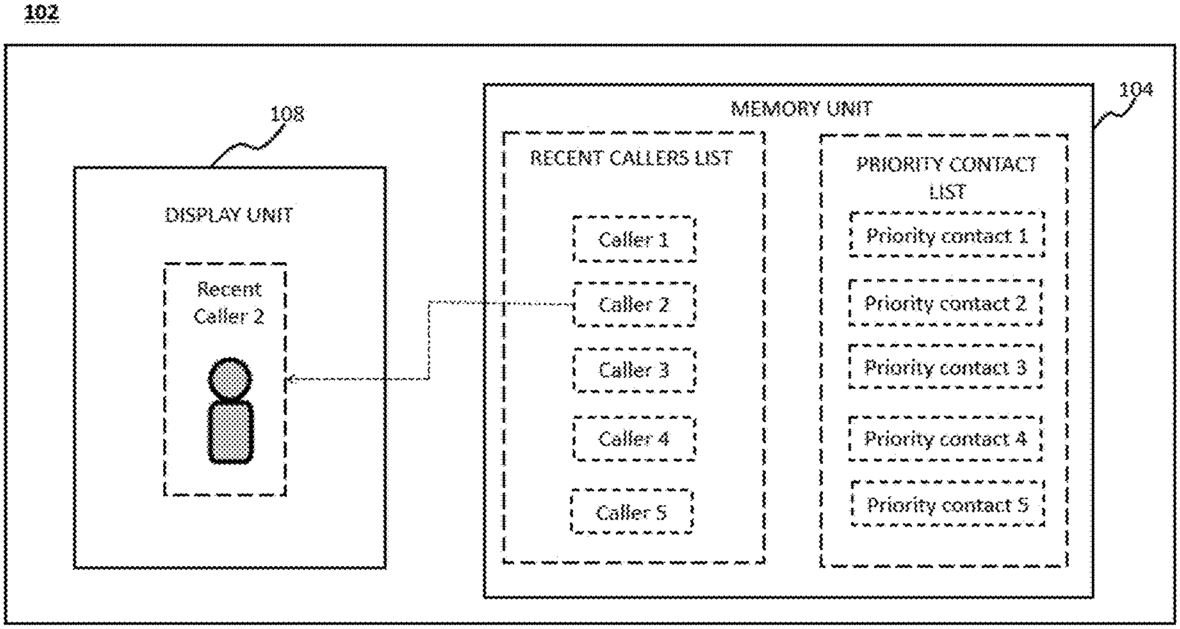
FIG. 3 illustrates a schematic diagram of the instrument cluster displaying an image of a caller on a display unit, in accordance with an exemplary embodiment of the present invention.

As shown in FIG. 3, the memory unit 104 of the instrument cluster 102 has stored the data of callers based on the recently contacted callers and the priority contact list from the PDA device 12 of the rider. In an exemplary embodiment, the recently contacted list in the memory unit 104 includes the data having contact numbers and images of five callers like caller 1, caller 2, caller 3, caller 4 and caller 5. In addition, the memory unit 104 further stores the data having contact numbers and images of five priority callers from the PDA device 12 of the rider. The five priority caller list may include priority contact 1, priority contact 2, priority contact 3, priority contact 4 and priority contact 5. After identifying the incoming call from a caller, the control unit compares the contact number of the incoming call with recently contacted numbers of callers and/or the prioritized contact list of the rider from the PDA device 12 which are saved in the memory unit 104. The control unit 106 communicates a signal indicative of an image of the caller to the display unit 108 of the instrument cluster 102 to display the image of the present caller onto the display unit 108 of the instrument cluster 102 when the present caller is determined to be one of the callers from the recently contacted caller and/or from the prioritized contact list. In the illustrated FIG. 3, the caller 2 from the recently called list is identified as the present caller, and the image and/or the contact number of the caller 2 is displayed onto the display unit 108. Since the image of the caller is obtained from the memory unit 104, the data transfer from the memory unit 104 to the display unit 108 does not load the control unit 106 and thus does not delay while displaying the image of the caller. Also, the image clarity is improved due to wired or USB communication between the memory unit 104 and the display unit 108 of the instrument cluster 102.

Figure 4:
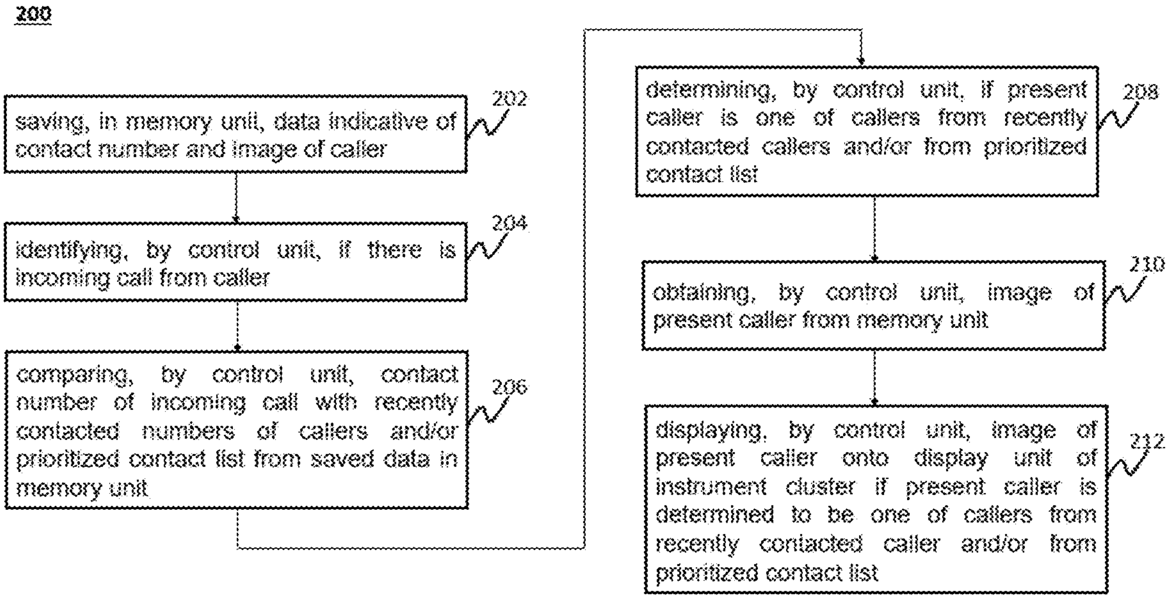
FIG. 4 illustrates a flowchart for a method for managing telephone calls in a vehicle, in accordance with an embodiment of the present invention.

FIG. 4 illustrates a flowchart for a method 200 for managing telephone calls in the vehicle 10, in accordance with an embodiment of the present invention. The method 200 includes at a step 202 saving, in the memory unit 104, data indicative of contact number and image of a caller. In an exemplary embodiment, the memory unit 104 can be configured to save the data of the recent five callers and the callers from the priority contact list of the rider.

At a step 204, the control unit 106 identifies if there is an incoming call from a caller, and at a step 206, the control unit 106 compares the contact number of the incoming call with the recently contacted numbers of callers and/or the prioritized contact list from the saved data in the memory unit 104.

At a step 208, the control 106 determines if present caller is one of the callers from the recently contacted callers and/or from the prioritized contact list.

At a step 210, the control unit 106 obtains an image of the present caller from the memory unit 104 and at a step 212, the control unit 106 communicates a signal to the display unit 108 for displaying the image of the present caller onto the display unit 108 of the instrument cluster 102 when the present caller is determined to be one of the callers from the recently contacted caller and/or from the prioritized contact list. Thus, the rider of the vehicle 10 will get a notification alert of the caller onto the display unit 108 through the display of the image of the caller.

Advantageously, the present invention eliminates the delay in displaying contact information (image and/or the contact number of the caller) when there is an incoming call to the rider of the vehicle. Since the memory unit in the instrument stores the data relating to the recently contacted callers and the priority contact list of the rider, the data of image and contact number are easily retrieved without any delay from the memory unit. This, in turn also reduces load on the control unit or processor in the instrument cluster.

Present invention solves the problem of slow transfer of data from the PDA device to the memory unit of the instrument cluster since the recently contacted caller's data is stored in the memory unit.

While the present invention has been described with respect to certain embodiments, it will be apparent to those skilled in the art that various changes and modification may be made without departing from the scope of the invention as defined in the following claims.

We claim:

1. A system for managing telephone calls in a vehicle, comprising:
- an instrument cluster configured to be in communication with a personal digital assistant device of a rider;
- a memory connected with the instrument cluster and configured to save data indicative of contact number and an image of a caller; and
- a processor in communication with the instrument cluster and the memory, wherein
- the processor is configured to:
  - identify if there is an incoming call from a caller,
  - compare contact number of the incoming call with recently contacted numbers of callers and/or a prioritized contact list from the saved data in the memory,
  - determine if present caller is one of the callers from the recently contacted callers and/or from the prioritized contact list,
  - obtain an image of the present caller from the memory, and
  - display the image of the present caller onto a display of the instrument cluster if the present caller is determined to be one of the callers from the recently contacted caller and/or from the prioritized contact list,
- the prioritized contact list of callers is obtained from the personal digital assistant device of the rider, and
- the prioritized contact list of callers is set based on frequency of calls received from a list of contacts in the personal digital assistant device of the rider.

2. The system as claimed in claim 1, wherein the prioritized contact list of callers is set by the rider of the vehicle.

3. The system as claimed in claim 1, wherein the memory is configured to save data indicative of contact numbers and images of callers from the prioritized contact list and/or from the frequently contacted callers list.

4. A method for managing telephone calls in a vehicle, comprising:
- saving, in a memory, data indicative of contact number and image of a caller;
- identifying, by a processor, if there is an incoming call from a caller;
- comparing, by the processor, the contact number of the incoming call with the recently contacted numbers of callers and/or a prioritized contact list from the saved data in the memory;
- determining, by the processor, if present caller is one of the callers from the recently contacted callers and/or from the prioritized contact list;
- obtaining, by the processor, an image of the present caller from the memory; and displaying, by the processor, the image of the present caller onto a display of the instrument cluster if the present caller is determined to be one of the callers from the recently contacted caller and/or from the prioritized contact list, wherein the prioritized contact list of callers is obtained from a personal digital assistant device of a rider, and the prioritized contact list of callers is set based on frequency of calls received from a list of contacts in the personal digital assistant device of the rider.

5. The method as claimed in claim 4, wherein the prioritized contact list of callers is set by the rider of the vehicle.

6. The method as claimed in claim 4, wherein the memory is configured to save data indicative of contact numbers and images of callers from the prioritized contact list and/or from the frequently contacted callers list.

* * * * *